H. P. HASTINGS & F. C. SMITH.
PLUG SOCKET AND FUSE BOX.
APPLICATION FILED AUG. 6, 1915.

1,278,339.

Patented Sept. 10, 1918.
3 SHEETS—SHEET 1.

WITNESSES:

INVENTORS.
Harold P. Hastings
Floyd C. Smith
BY Parsons + Bodell
ATTORNEYS.

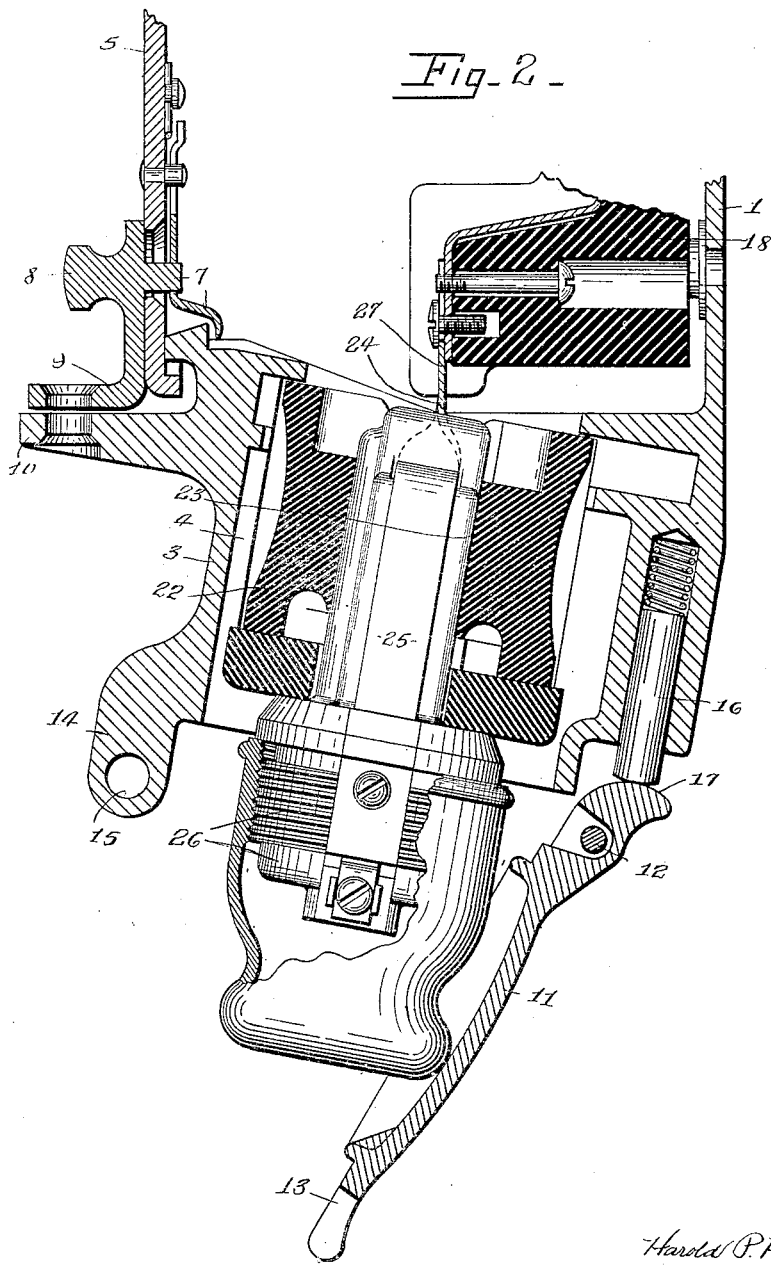

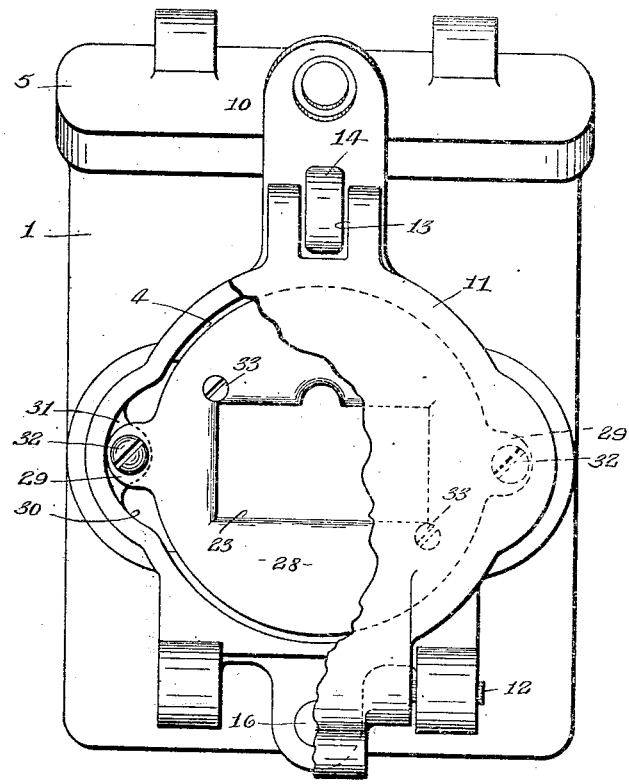

UNITED STATES PATENT OFFICE.

HAROLD P. HASTINGS AND FLOYD C. SMITH, OF SYRACUSE, NEW YORK, ASSIGNORS TO CROUSE-HINDS COMPANY, OF SYRACUSE, NEW YORK, A CORPORATION OF NEW YORK.

PLUG-SOCKET AND FUSE-BOX.

1,278,339.   Specification of Letters Patent.   Patented Sept. 10, 1918.

Application filed August 6, 1915. Serial No. 43,970.

*To all whom it may concern:*

Be it known that we, HAROLD P. HASTINGS and FLOYD C. SMITH, citizens of the United States, and residing at Syracuse, in the county of Onondaga and State of New York, have invented a certain new and useful Plug-Socket and Fuse-Box, of which the following is a specification.

This invention relates to electrical connections and housings therefor, and has for its object a particularly simple and efficient plug socket and fuse block connection therefor, and a housing or conduit outlet box inclosing and supporting both of the appliances, so that they are coupled together and are accessible in a particularly simple and efficient manner; and the invention consists in the combinations and constructions hereinafter set forth and claimed.

In describing this invention, reference is had to the accompanying drawings, in which like characters designate corresponding parts in all the views.

Fig. 2 is a fragmentary view of parts seen in Fig. 1 showing the plug as inserted in the plug socket.

Fig. 3 is an end view, partly broken away, looking upwardly in Fig. 1.

Figure 1:
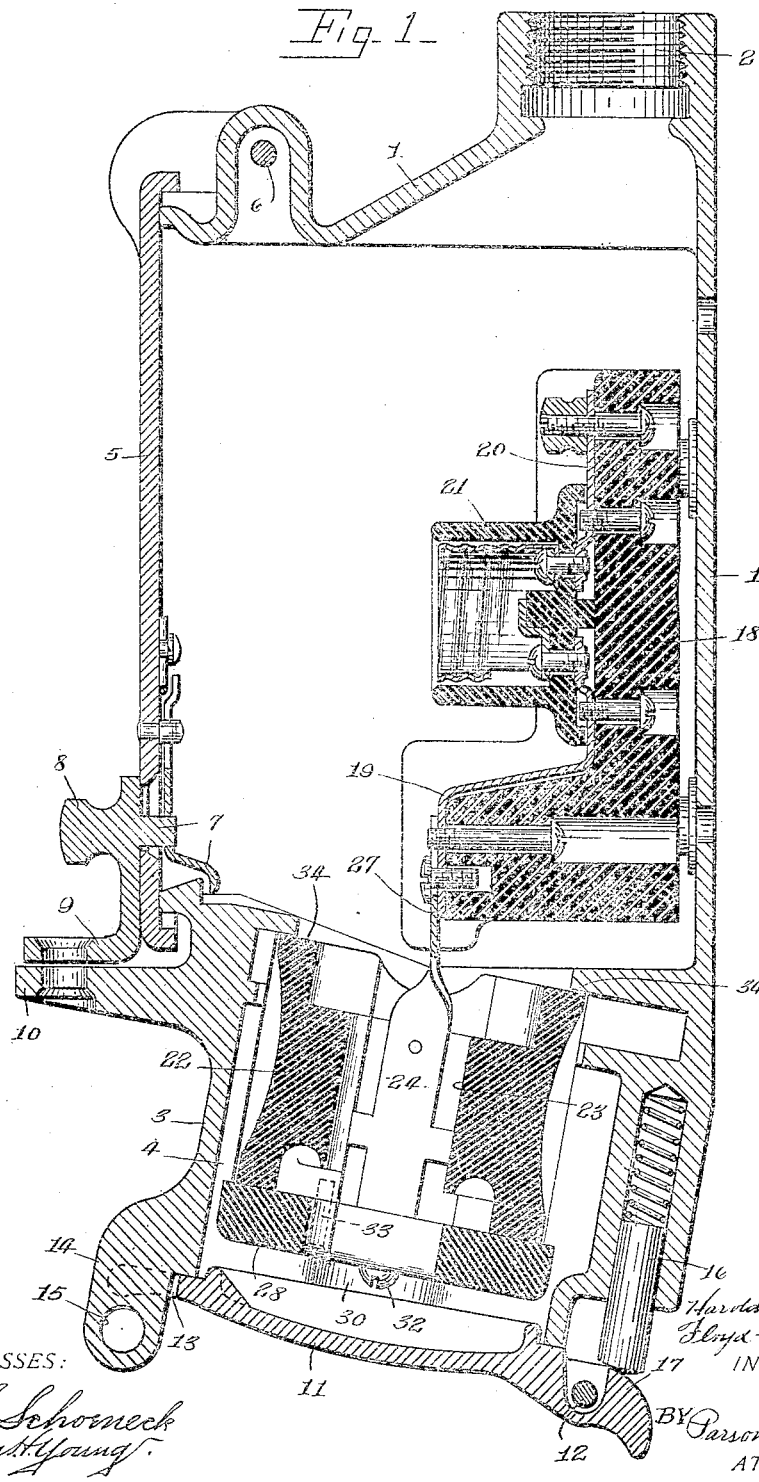
Figure 1 is a longitudinal sectional view through the conduit outlet box and the appliances therein.

This invention comprises, generally, a conduit outlet box including a body open at one side and an extension arranged at one end of the body and having a passage open at its outer end and opening at its inner end into the interior of the body, an electrical appliance including a base block mounted in the body of the box and being movable into, and removable from, the box through the open side thereof, an electrical appliance supported in the extension and having terminals connected directly to terminals on the base block, both of these electrical appliances being accessible to other electrical appliances which are movable through the open side of the box and the open end of the extension, and covers for the open side of the box and for the outer end of the extension.

1 is the body of the conduit outlet box which is preferably rectangular in general outline and is open at its top, or at its front side in case the box is mounted on a wall, and which has means as an internally threaded nipple 2 at one end for connection to the electrical conduit inclosing the service wires.

3 is the extension provided preferably on the other end of the box and having a passage 4 which is open at its outer end and opens at its inner end into the interior of the body 1 of the box.

5 is a cover hinged at 6 to the body of the box and having a lock designated generally by the numeral 7 for holding it in its closed position. This lock 7 includes a movable hand piece or knob 8 slidable on the outer face of the cover and carrying therewith a perforated lug 9 which is movable toward and from a perforated lug 10 rising from the contiguous portion of the box as from the extension 3, the perforations of the lugs 9, 10 being alined for receiving the locking device, as a padlock.

11 is a cover for the outer end of the passage 4 of the extension 3, this cover being hinged at 12 at one side and having its free end provided with a slot 13 which receives a tongue 14 projecting from the contiguous side of the extension, this tongue being provided with a perforation 15 for receiving the shackle of a padlock or other locking device by means of which the cover is locked in closed position. The cover 11 is moved toward its closed position by a spring-pressed plunger 16 acting on a cam shaped surface 17 provided on a tongue on the outer side of the pivot 12 of the cover 11.

The electrical appliance located in the body 1 of the box is here shown as a fuse block including a base 18 having suitable terminals or bars 19, 20 thereon to which are connected the terminals of the fuse plug socket 21 or the terminals of a fuse of any other description. The fuse plug in the socket is an electrical appliance attachable to the socket through the open side of the body of the box.

The electrical appliance located in the extension 3 is a plug socket and includes a body 22 of insulation having a suitable passage 23 and terminals 24 located in the passage 23 in position to engage the terminals 25 of the plug 26. The terminals 24 are connected directly to the terminals 19 of the fuse block, and are here shown as formed with rigid extensions 27 which extend into the interior of the box 1 and lap the portions of the terminals or bars 19 on the upper face of the base block 18. The plug 26 is an electrical appliance to which the plug socket is accessible through the open end of the extension.

Preferably, the passage 4 of the extension 3 is cylindrical in general form and has lengthwise passages on opposite sides thereof, and the body 22 of the plug socket is cylindrical in general form to conform to the cylindrical portion of the passage 4, and said body 22 has an entrance piece 28 at its front end, which entrance piece has laterally extending lugs 29 extending into the lengthwise channels 30 of the extension 3. The lugs 29 abut against the shoulders 31 projecting into said channels and are secured thereto by suitable screws 32, and said entrance piece is also secured to the body 22 by screws 33.

The body 22 of the plug socket abuts at its inner end against an internal shoulder 34 provided on the box at the inner end of said passage 4. The plug 26 may be of any suitable form, size and construction and forms the subject-matter of our pending application, Sr. No. 42,760, filed July 30, 1915.

In use, the fuse plug base and parts thereon and also the plug socket can be easily placed in position or removed when necessary, and owing to the arrangement of the box and the extension thereof, the terminals of the socket can be connected directly to the terminals of the fuse plug base.

What we claim is:—

1. A conduit outlet box including a body open on one side and having an extension projecting from another of its side walls, the extension being open at its outer end and opening at its inner end into the interior of the body of the box, an electrical appliance including a base mounted in the body and movable therein through the open side thereof and terminals mounted on the base, and a second electrical appliance including a body mounted in the extension and movable therein through the open end thereof, and terminals mounted on the second body and extending beyond the inner end face of said body into the interior of the box and arranged to come in juxtaposition to the first-mentioned terminals to be connected directly thereto when the second appliance is placed in the extension, substantially as and for the purpose described.

2. The combination of a conduit outlet box having an extension at one end, the extension being open at its outer end and opening at its inner end into the box, the extension being also formed with a shoulder at its inner end, a plug socket including a body, and an entrance piece at one end of the body, the body abutting against the shoulder at the inner end of the extension, and the extension being also formed with shoulders for engaging the entrance piece, and means for securing the entrance piece to the body and for securing the entrance piece to the last-mentioned shoulder, substantially as and for the purpose specified.

3. The combination of a conduit outlet box having a passage open at its opposite ends, a plug socket located in the passage and including a body and an entrance piece having portions extending laterally beyond the periphery of the body, and means extending through said portions and into the box for holding the socket in position, substantially as and for the purpose set forth.
4. The combination of a conduit outlet box formed with a passage open at its opposite ends, the walls of the passage being cylindrical in form and having laterally extending lengthwise channels on opposite sides thereof, and a plug socket located in the passage and including a cylindrical portion conforming to the cylindrical portion of the passage and also having an entrance piece secured thereto and having laterally extending lugs in the channels, substantially as and for the purpose described.

5. The combination of a conduit outlet box formed with a passage open at its opposite ends, the walls of the passage being cylindrical in form and having laterally extending lengthwise channels on opposite sides thereof, and shoulders projecting into the channels, and a plug socket located in the passage and including a cylindrical portion conforming to the cylindrical portion of the passage and also having an entrance piece secured thereto and having laterally extending lugs in the channels, the lugs being secured to said shoulders, substantially as and for the purpose specified.

In testimony whereof, we have hereunto signed our names at Syracuse, in the county of Onondaga, and State of New York, this 30th day of July, 1915.

HAROLD P. HASTINGS.
FLOYD C. SMITH.